US007011727B2

(12) United States Patent
Torii et al.

(10) Patent No.: US 7,011,727 B2

(45) Date of Patent: *Mar. 14, 2006

(54) THERMAL TRANSFER FILM AND IMAGE FORMING METHOD

(75) Inventors: Masanori Torii, Tokyo-to (JP); Mitsuru Maeda, Tokyo-to (JP); Fumihiko Mizukami, Tokyo-to (JP); Shigeki Chujo, Tokyo-to (JP)

(73) Assignee: DAI Nippon Printing Co., Ltd., Tokyo-to (JP)

( * ) Notice: Subject to any disclaimer, the term of this patent is extended or adjusted under 35 U.S.C. 154(b) by 14 days.

This patent is subject to a terminal disclaimer.

(21) Appl. No.: 10/465,160

(22) Filed: Jun. 19, 2003

(65) Prior Publication Data

US 2003/0211253 A1 Nov. 13, 2003

Related U.S. Application Data

(62) Division of application No. 09/836,395, filed on Apr. 17, 2001, now Pat. No. 6,610,387.

(30) Foreign Application Priority Data

Apr. 19, 2000 (JP) ............................ 2000-117529

(51) Int. Cl.
*B32B 31/20* (2006.01)
*B41J 2/315* (2006.01)

(52) U.S. Cl. ...................... 156/230; 156/234; 347/171; 347/202; 347/217

(58) Field of Classification Search ................ 156/230, 156/231, 234, 235, 238, 239, 240; 428/98, 428/195; 347/171, 172, 202, 176, 213, 217

See application file for complete search history.

(56) References Cited

U.S. PATENT DOCUMENTS

| | | | | |
|---|---|---|---|---|
| 4,882,218 | A * | 11/1989 | Koshizuka et al. | 428/32.77 |
| 6,548,148 | B1 * | 4/2003 | Torii et al. | 156/235 |
| 6,610,387 | B1 * | 8/2003 | Torii et al. | 428/304.4 |
| 2003/0198776 | A1 * | 10/2003 | Torii et al. | 428/98 |

* cited by examiner

*Primary Examiner*—Melvin Mayes

(74) *Attorney, Agent, or Firm*—Ladas & Parry LLP

(57) ABSTRACT

A thermal transfer film comprises a coloring layer formed on a substrate film via an intermediate layer, wherein the intermediate layer contains a thermally fusible substance and a non-transferable binder resin, the melt viscosity of the thermally fusible substance in the temperature range 15 to 25° C. higher than the fuse peak temperature of the thermally fusible substance is in the range of 100 to 1000 mPa·s, the fuse peak temperature of the thermally fusible substance is in the range of 50 to 110° C., the crystallization peak temperature of the thermally fusible substance is in the range of −20 to 100 ° C., the crystallization peak temperature of the thermally fusible substance is lower than the fuse peak temperature by 10° C. or more, and the softening temperature of the binder resin measured by the ring and ball method is in the range of 130 to 400° C. This thermal transfer film is capable of forming a printed product with a good printing quality.

12 Claims, 1 Drawing Sheet

THERMAL TRANSFER FILM AND IMAGE FORMING METHOD

This application is a division of U.S. application Ser. No. 09/836,395, filed Apr. 17, 2001, now U.S. Pat. No. 6,610, 387.

BACKGROUND OF THE INVENTION

1. Field of the Invention

The present invention relates to a thermal transfer film comprising a coloring layer formed on a substrate film via an intermediate layer, and more particularly relates to a thermal transfer film which can give a clear printing without lack of impression to a paper to be printed and allows reliable coating of an intermediate layer and a coloring layer on a substrate film and has secret leakage preventing properties, and an image forming method using the same.

2. Description of the Related Art

Conventionally, thermal transfer films comprising a coloring layer comprising a thermally fusible ink formed on one side of a substrate film have been used as thermal transfer recording media used for thermal transfer printers, facsimiles and the like.

Conventional thermal transfer films have substrate films made of about 10 to 20 $\mu$m thick papers such as condenser paper and paraffin paper or about 3 to 20 $\mu$m thick plastic films such as polyester and cellophane and coloring layers obtained by coating on the substrate film thermally fusible inks which are mixtures of binders, colorants such as pigments and dyes, and additives such as melting point-lowering agents and plasticizers as occasion demands. Some thermal transfer films have intermediate layers adjusted to melt by the energy for printing between the substrate films and coloring layers.

The substrate films are heated and pressed in the predetermined areas by thermal heads from behind to melt the coloring layers corresponding to the printing areas to transfer the same onto transfer receiving materials for printing.

However, when the conventional thermal transfer films having intermediate layers and thermally fusible coloring layers formed on substrate films are used for printing, there have been problems that letters and fine lines are blurred by lack of impression to give the printed materials a patchy appearance and that there is a large noise emitted when the thermal transfer films are separated from transfer receiving materials. In order to print without lack of impression on coarse papers with a Beck smoothness of 50 seconds or lower, it is necessary to transfer all the coloring layer without occurrence of lack of impression to the printed materials (without being left on the intermediate layer) in the areas to which energy is applied according to the pixel by a means such as a thermal head to a transfer receiving paper. It is effective to separate the transfer receiving material from the thermal transfer film when the intermediate layer of the thermal transfer film, which has a coloring layer via the intermediate layer on the substrate film, is melted and flowable, and therefore in a liquid state in order to transfer all the necessary coloring layers to the transfer receiving paper. However, there is a time interval between the time when the transfer receiving material and the thermal transfer film are superimposed and the printing energy is applied to the thermal transfer film and the time when the thermal transfer film is separated from the transfer receiving material in machines generally used such as facsimiles using thermal transfer films. There arises a disadvantage in that the intermediate layer is cooled and solidified or decreases in flowability if not solidified in the time interval even when the intermediate layer is adjusted to melt by the printing energy.

Incidentally, materials having so-called supercooling properties, which have freezing points 10° C. or lower than their melting points, are known in various literatures. Techniques about thermal transfer films having coloring layers on the substrate films via intermediate layers comprising various materials having supercooling properties are known. For example, such techniques are disclosed in Japanese Patent Application Laid-Open Nos. 61-235189, 61-286195, 62-9991, 62-82084, 63-302090, 3-246094 and others. On the other hand, it is well known that polycaprolactone-based resins have supercooling properties in various literatures. Techniques about thermal transfer films having coloring layers containing the polycaprolactone-based resin formed on the substrate films are well known. For example, such techniques are disclosed in Japanese Patent Application Laid-Open Nos. 59-230795, 60-122194, 60-122195, 61-185492, 62-59089, 5-32073 and others.

Furthermore, techniques about thermal transfer films having coloring layers via intermediate layers containing the polycaprolactone-based resin formed on the substrate films are well known. For example, Japanese Patent Application Laid-Open No. 60-165291 discloses that the polycaprolactone-based resin is used in an intermediate layer for the purpose of multiple printing and Japanese Patent Application Laid-Open No. 7-232483 discloses that polycaprolactone with a molecular weight of 10,000 or less is used in a primer layer for the purpose of facilitating high-speed printing and smooth printing in a high temperature atmosphere.

However, the thermal transfer films employing the intermediate layers according to these techniques still have the disadvantage in that letters and fine lines are blurred by lack of impression to give the printed materials a patchy appearance. What is worse, the thermal transfer films have a disadvantage in that when the ink for forming the intermediate layer is coated on the substrate film, the intermediate layer material stays melted by the heat for drying for a while even after the intermediate layer ink has been heated and dried, which undesirably causes adhesion between the substrate film side of the thermal transfer film wound after the coating and the intermediate layer side. Moreover, when a coloring layer is coated on the substrate film having an intermediate layer formed thereon, the hot-melt coating method, which facilitates the low-cost coating because no solvent is needed, has a disadvantage in that polycaprolactone present in the intermediate layer is melted and becomes fluid by the heat of the heated and melted coloring layer ink, which prohibits the coloring layer ink from being coated with a good surface quality.

SUMMARY OF THE INVENTION

It is an object of the present invention to solve the above-mentioned drawbacks and problems to provide a thermal transfer film which can give a clear printing without occurrence of lack of impression in the printed paper and allows reliable coating of an intermediate layer and a coloring layer on a substrate film and which has secret leakage preventing properties and an image forming method using the same.

In order to achieve the object, the inventor has investigated melt viscosities of thermally fusible substances having supercooling properties which are in a melted state when the transfer receiving material and the thermal transfer film are separated and has completed the present invention about the thermal transfer film. Furthermore, the inventor has evaluated coating suitability of intermediate layers containing thermally fusible substances having supercooling properties and overcoating suitability of coloring layers onto intermediate layers, and has identified a series of binder resins which can improve the both suitabilities without adversely affecting melt viscosities of thermally fusible substances having supercooling properties, and has completed the present invention about the thermal transfer film. Furthermore, the inventor has measured and examined time intervals between the time when the thermal transfer film and the transfer receiving material are superimposed and heated to record and the time when the two materials are separated and has completed the present invention about the image forming method in which lack of impression does not occur in the printed material and a clear printing is possible.

Accordingly, the thermal transfer film according to the present invention is a thermal transfer film having a coloring layer via an intermediate layer formed on a substrate film, wherein the intermediate layer contains a thermally fusible substance and a non-transferable binder resin, and the melt viscosity of the thermally fusible substance in the temperature range 15 to 25° C. higher than the fuse peak temperature (the fuse peak temperature defined in JIS K7121-1987) of the thermally fusible substance is 100 mPa·s or more and 1000 mPa·s or less, and the fuse peak temperature (the fuse peak temperature defined in JIS K7121-1987) of the thermally fusible substance is in the range of 50 to 110° C., and the crystallization peak temperature (the crystallization peak temperature defined in JIS K7121-1987) of the thermally fusible substance is in the range of −20 to 100° C., and the crystallization peak temperature of the thermally fusible substance is lower than the fuse peak temperature by 10° C. or more, and the softening temperature of the binder resin (the softening temperature measured by the ring and ball method defined in the JIS K2207-1980) is 130° C. or more and 400° C. or less.

Furthermore, it is preferable that the binder resin is incompatible with the thermally fusible substance.

Furthermore, it is preferable that the intermediate glass transition temperature (the intermediate glass-transition temperature defined in the JIS K7121-1987) of the binder resin is higher than the fuse peak temperature (the fuse peak temperature defined in the JIS K7121-1987) of the thermally fusible substance by 2° C. or more.

Furthermore, it is preferable that the binder resin has a number average molecular weight of 8,000 or more and 1,000,000 or less, and has a benzene ring structure, and is a polyester resin.

Furthermore, it is preferable that the intermediate layer has a carbon black incorporated therein.

Furthermore, it is preferable that the binder resin forms a porous membrane which is not thermally transferable, and that the porous membrane has the thermally fusible substance contained in the pores, and that a carbon black is incorporated in the porous membrane.

Furthermore, it is preferable that the melt viscosity of the coloring layer at 100° C. is 150 mPa·s or more and 300 mPa·s or less, and that the difference between the fuse peak temperature (the fuse peak temperature defined in the JIS K7121-1987) of the coloring layer and the fuse peak temperature (the fuse peak temperature defined in the JIS K7121-1987) of the thermally fusible substance is 10° C. or less.

The image forming method of the present invention comprises steps of:

providing the above-mentioned thermal transfer film according to the present invention;

providing a transfer receiving material;

superimposing the transfer receiving material on a coloring layer side of the thermal transfer film;

heating and recording from the substrate film side according to the pixel by heating means and separating the thermal transfer film and the transfer receiving material, wherein a time interval between recording each pixel and separating the thermal transfer film and the transfer receiving material is 2 seconds or less.

Furthermore, it is preferable that the heating means is a thermal head of an entire surface glaze or a partial glaze.

In the above-described present invention, even if the intermediate layer made of a thermally fusible substance and a specific binder resin is cooled to some degree in the areas where the printing energy has been applied in the time interval between printing and separation, the interface with the coloring layer remains melted and is low in viscosity due to the supercooling properties of the components, which allows the coloring layer to transfer from the thermal transfer film to the transfer receiving material with a low stripping force and prevents the coloring layers in the areas where the printing energy has been applied from undergoing cohesive failure in the layer and from being left on the intermediate layer. This enables all the coloring layer in the areas where the energy has been applied to transfer to the transfer receiving material and thus a good printing with little patchiness can be obtained even when a rough paper is used.

JIS K7121-1987 teaches testing methods for determining transition temperatures (melting temperatures, crystallization temperatures, and glass transition temperatures) of plastics. Each method teaches measuring the difference in temperature between a test specimen and a reference substance as a function of temperature while varying the temperatures of the test specimen and reference substance according to a controlled programme.

Where the melting temperature is to be determined, preliminary maintain the reference substance until it stabilizes at a temperature about 100° C. lower than the melting temperature of the test specimen, and then heat the reference substance to a temperature about 30° C. higher than that at the end of melting peak at a heating rate of 10° C. per minute, while measuring the temperature difference between the reference substance and the test specimen, to obtain a melting curve. The melting peak temperature (fuse peak temperature) is defined as the crest of the melting peak on the melting curve Where the crystallization temperature is to be determined, heat the reference substance to a temperature about 30° C. higher than that at the end of melting peak, and after maintaining this temperature for 10 minutes, cool to a temperature about 50° C. lower than that at the end of crystallIzatIon peak at a cooling rate of 5° C. or 10° C. per minute, while measuring the temperature difference between the reference substance and the test specimen to obtain a crystallization curve. The crystallization peak temperature is defined as the crest of the crystallization peak on the crystallization curve.

Where the glass transition temperature is to be determined, prefiminarily maintain the reference substance until it stabilizes at a temperature about 50° C. lower than the transition temperature, and then heat the reference substance, to a temperature about 30° C. higher than that at the end of transition at a heating rate of 20° C. per minute, while measuring the temperature difference between the reference substance and the test specimen, to obtain a glass transition curve.

Find the mid-point temperature of glass transition as the temperature at the intersection of the straight line equidistant in the vertical axial direction from the straight lines formed by extending the respective base lines and the curve showing a stepped change of glass transition.

Find the extrapolated onset temperature of glass transition (intermediate glass transition temperature) as the temperature at the intersection of the straight line formed by extending the base line on the low temperature side to the high temperature side and the tangent line drawn to the curve showing a stepped change of glass transition at a point of maximum gradient.

JIS K2207-1980 teaches a test method for determining the softening point of a test specimen. The method is carried out by casting a sample in specified rings, supporting them horizontally in a water or glycerin bath and place a specified weight ball on the centre of each ring. The softening temperature is defined as the temperatures at which the sample softens, sags downwards and touches the bottom plate of the ring holder by the weight of a steel ball, when the bath temperature is raised at a specified rate. The ring shall be a shouldered ring made of brass or brass with nickel or chrome plating. The ball shall be a ⅜ (dia. 9.525 mm) Ordinary Class ball with the mass of 3.5±0.05 g. The guide shall be made of brass or brass with nickel or chrome plating. The ring holder shall be made of brass or brass with nickel or chrome plating and capable of supporting a thermometer and rings as described below.

Rings can be supported horizontally under such a position that the distance between the upper surface of the ring and the upper edge of the heating bath is 75 mm and over, and the distance between the former and the bath liquid surface is 50 mm and over downwards, respectively.

The distance between the lower surface of the ring and the upper surface of the bottom plate of ring holder shall be 25.4 mm. and the bottom plate shall be 12.7 to 19.1 mm above the bottom of the heating bath.

The thermometer shall be supported at the position whose bottom end of the bulb is the same horizontal plane as the lower surface of the ring, and within 10 mm from the ring, without touching the sample shelf.

DESCRIPTION OF THE PREFERRED EMBODIMENTS

Figure 1:
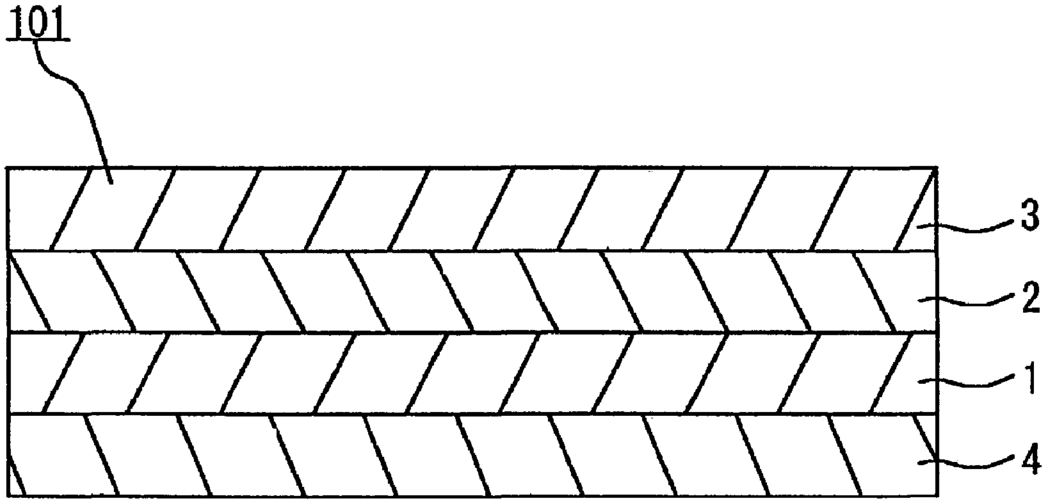
FIG. 1 is a sectional view schematically showing one example of thermal transfer film of the present invention.

Embodiments of the present invention will be next described.

Thermal Transfer Film

As shown in FIG. 1, the thermal transfer film (101) of the present invention is a thermal transfer film having a coloring layer 3 formed on a substrate film 1 via an intermediate layer 2, and the intermediate layer contains a thermally fusible substance and a non-transferable binder resin. A heat resistant slipping layer 4 may be formed on a back side of the thermal transfer film. In the intermediate layer, the melt viscosity of the thermally fusible substance in the temperature range 15 to 25° C. higher than the fuse peak temperature (the fuse peak temperature defined in the JIS K7121-1987) of the thermally fusible substance is 100 mPa·s or more and 1000 mPa·s or less, and the fuse peak temperature (the fuse peak temperature defined in the JISK7121-1987) of the thermally fusible substance is in the range of 50 to 110° C., and the crystallization peak temperature (the crystallization peak temperature defined in the JIS K7121-1987) of the thermally fusible substance is in the range of −20 to 100° C., and the crystallization peak temperature of the thermally fusible substance is lower than the fuse peak temperature by 10° C. or more. Moreover, the softening temperature of the binder resin (the softening temperature measured by the ring and ball method defined in the JIS K2207-1980) is 130° C. or more and 400° C. or less.

(Substrate Film)

No specific limitation is imposed on the substrate film for use for a thermal transfer film of the present invention. The substrate films used for the conventional thermal transfer films can be used without modification and other films can also be used.

Specific examples of preferable substrate films include: plastics such as polyester, polypropylene, cellophane, polycarbonate, cellulose acetate, polyethylene, polyvinyl chloride, polystyrene, nylon, polyimide, polyvinylidene chloride, polyvinyl alcohol, fluorine resin, chlorinated rubber, and ionomer; papers such as condenser paper and paraffin paper; non-woven fabric; and composite films thereof.

The thickness of the substrate film can be adjusted so as to optimize the strength and heat conductivity depending on the material used, and the thickness is preferably, for example, 3 to 10 μm.

(Intermediate Layer)

The intermediate layer contains a thermally fusible substance and a non-transferable binder resin, and the melt viscosity of the thermally fusible substance in the temperature range 15 to 25° C. higher than the fuse peak temperature (the fuse peak temperature defined in the JIS K7121-1987) of the thermally fusible substance is 100 mPa·s or more and 1000 mPa·s or less, and the fuse peak temperature (the fuse peak temperature defined in the JIS K7121-1987) of the thermally fusible substance is in the range of 50 to 110° C., and the crystallization peak temperature (the crystallization peak temperature defined in the JIS K7121-1987) of the thermally fusible substance is in the range of −20 to 100° C., and the crystallization peak temperature of the thermally fusible substance is lower than the fuse peak temperature by 10° C. or more, and the softening temperature of the binder resin (the softening temperature measured by the ring and ball method defined in the JIS K2207-1980) is 130° C. or more and 400° C. or less.

When plural fuse peak temperatures are observed as measured according to the JIS K7121-1987, the peak at the highest temperature is taken as the fuse peak temperature of the present invention. Likewise, when plural crystallization peak temperatures are observed, the peak at the highest temperature is taken as the crystallization peak temperature of the present invention.

The thermally fusible substance used for the intermediate layer of the present invention includes polyethylene glycol and derivatives thereof, polycaprolactone-based resin, and polyurethane wax, but any material can be used provided its melt viscosity in the temperature range 15 to 25° C. higher than the fuse peak temperature is 100 mPa·s or more and 1000 mPa·s or less, and its fuse peak temperature defined in the JIS K7121-1987 is in the range of 50 to 110° C., and its crystallization peak temperature defined in the JIS K7121-

1987 is in the range of −20 to 100° C., and it has supercooling properties such that the crystallization peak temperature is lower than the fuse peak temperature by 10° C. or more. Plural thermally fusible substances can be used in combination.

The melt viscosity in the present invention can be measured by using the device below.

Name of device: Viscoelasticity measurement device Rotovisco RV20 (manufactured by HAKKE)

Measurement head: M5

Sensor system: Sensor system cone plate PK5 (aperture angle 0.5°, radius of cone plate 25 mm) or sensor system type MV (MV1). The cone plate and sensor system should be appropriately selected according to the viscosity range to be measured.

Polyethylene glycol derivatives with a molecular weight of about 3,000 to 5,000 are preferably used as the above-mentioned polyethylene glycol.

The above-mentioned polycaprolactone-based resin is a resin which has a repeated structure obtained by polymerizing ϵ-caprolactone monomer (designated chemical substance No. 5-1091), and examples include polycaprolactone diol and polycaprolactone triol (designated chemical substance No. 7-808).

Furthermore, hydroxyl groups present at an end portion of the above-mentioned polyethylene glycol may be substituted by various groups.

Any substance, for example, a polyester-based substance, a silicone-based substances, or a polyamide-based substance can be suitably used as the thermally fusible substance provided it has the above-mentioned properties.

The fuse peak temperature (the fuse peak temperature defined in the JIS K7121-1987) of the thermally fusible substance is in the range of 50 to 110° C., and the crystallization peak temperature (the crystallization peak temperature defined in the JIS K7121-1987) of the thermally fusible substance is in the range of −20 to 100° C., and the crystallization peak temperature of the thermally fusible substance is lower than the fuse peak temperature by 10° C. or more.

When the above-mentioned fuse peak temperature is below 50° C., it is disadvantageous because an "entanglement phenomenon" by the preheating of the thermal head is likely to occur. When the fuse peak temperature is above 110° C., it decreases in sensitivity. Furthermore, when the above-mentioned crystallization peak temperature is below −20° C., the thermally fusible substance remains fusing for an excessively prolonged period of time after an ink for forming the intermediate layer is coated on the substrate film and the intermediate layer is heated and dried, which disadvantageously causes adhesion between the substrate film side of the thermal transfer film (the opposite side of the surface on which the intermediate layer is formed) wound after the coating and the intermediate layer side.

When the difference between the crystallization peak temperature and the fuse peak temperature is below 10° C., the thermally fusible substance has poor supercooling properties, and the thermally fusible substance, which has been melted and low in viscosity by the heat for printing, crystallizes and solidifies, or the thermally fusible substance, which has been melted and low in viscosity by the heat for printing, increases in viscosity as the temperature is decreased, which causes lack of impression in the printed material and prohibits a clear printing.

Incidentally, the upper limit of the difference between the crystallization peak temperature and the fuse peak temperature is not specifically limited provided the crystallization peak temperature and the fuse peak temperature meet the above-mentioned conditions.

In the intermediate layer composing the thermal transfer film of the present invention, it is important that the binder resin is not melted when heated for printing and stays on the substrate film side of the thermal transfer film, not transferring to a transfer receiving material. It is preferable that the binder resin and the thermally fusible substance are incompatible with each other for this purpose. Namely, in the intermediate layer of the present invention which contains the thermally fusible substance and the binder resin, it is important that the intermediate layer is formed such that the crystallization peak temperature and the fuse peak temperature of the thermally fusible substance do not substantially change even when the thermally fusible substance is mixed with the binder resin to form an intermediate layer. For this purpose, it is preferable that the thermally fusible substance exists in the pores of a porous membrane of the binder resin.

The incompatibility in the present invention will be next described. A thermally fusible substance and a binder resin are considered to be incompatible when the temperature difference between the fuse peak temperature of the thermally fusible substance used for an intermediate layer alone and the fuse peak temperature of the intermediate layer containing both the binder resin and the thermally fusible substance formed on a polyethylene terephthalate film is within 5° C. The fuse peak temperature should be measured according to the JIS K7121-1987.

When the above-mentioned difference between the fuse peak temperatures exceeds 5° C., part of, or all the binder resin is considered to be dissolved in the thermally fusible substance at a molecular level. In this case, even when the thermally fusible substance melts, the binder resin reduces the flowability of the thermally fusible substance and increases the melt viscosity. As a result, there is a disadvantage in that a good printing without lack of impression cannot be achieved on a rough paper. Furthermore, when the binder resin is completely dissolved at a molecular level in the thermally fusible substance, the fuse peak temperature due to the fusion of thermally fusible substance disappears. In this case again, there is a disadvantage in that a good printing without lack of impression cannot be achieved on a rough paper.

It is preferable that the intermediate layer has a porous structure as described above in the present invention. When the binder resin forms a network-like porous membrane, the binder resin does not melt when heated for printing, stays on the substrate film side of the thermal transfer film, and does not transfer to a transfer receiving material.

Furthermore, the thermally fusible substance, which is contained in the pores of the porous membrane, transfers when heated for printing with a low melt viscosity to the transfer receiving material and the transfer receiving material and the thermal transfer film are separated with the intermediate layer still melting due to the supercooling properties of the thermally fusible substance even if the intermediate layer is cooled to some degree between the printing and the separation. This enables all the coloring layer in the areas where the energy is applied to transfer to the transfer receiving material and a good printing without lack of impression can be obtained even on a rough paper.

In order to achieve this, the thermally fusible substance and the binder resin, which are main components of the intermediate layer, are preferably such that the thermally fusible substance has a melt viscosity in the temperature range 15 to 25° C. higher than the fuse peak temperature of 100 mPa·s or more and 1000 mPa·s or less; the binder resin has a softening temperature measured by the ring and ball method defined in the JIS K2207-1980 is 130° C. or more and 400° C. or less; the binder resin and the thermally fusible substance are incompatible with each other; and the binder resin has a porous structure as a layer.

When the thermally fusible substance used in the present invention has a melt viscosity in the temperature range 15 to 25° C. higher than the fuse peak temperature above 1000 mPa·s, it is difficult to appropriately separate the binder resin and the thermally fusible substance in a process where a coating solution for forming an intermediate layer is coated on the substrate film and dried, and the effect caused by the fact that the thermally fusible substance is in a supercooled state cannot substantially be obtained, which makes it difficult to transfer all the necessary coloring layer to the transfer receiving material without a lack of impression. Furthermore, even when the binder resin and the thermally fusible substance are appropriately separated, the thermally fusible substance has insufficient flowability as a liquid at the point where the transfer receiving material and the thermal transfer film are separated after the thermally fusible substance is in a fused state by the application of the energy for printing with a melt viscosity of the thermally fusible substance in the temperature range 15 to 25° C. higher than the fuse peak temperature above 1000 mPa·s, which makes it difficult to transfer all the necessary coloring layer to the transfer receiving material without lack of impression.

When the thermally fusible substance used in the present invention has a melt viscosity in the temperature range 15 to 25° C. higher than the fuse peak temperature below 100 mPa·s, it is difficult to appropriately separate the binder resin and the thermally fusible substance in a process where a coating solution for forming an intermediate layer is coated on the substrate film and dried, and the effect caused by the fact that the thermally fusible substance is in a supercooled state cannot substantially be obtained, which makes it difficult to transfer all the necessary coloring layer to the transfer receiving material without lack of impression. Furthermore, even when the binder resin and the thermally fusible substance are appropriately separated, it is difficult to coat a coloring layer with a good surface quality by hot-melt coating on the substrate film on which the intermediate layer is formed.

The porous membrane in the present invention may be a membrane with a porous structure which can be observed visually or by a optical microscope, a scanning electron microscope, a transmission electron microscope, or a confocal laser microscope or may be a membrane with an extreme fine porous structure which cannot be observed by these devices.

Any resin can be used as the binder resin which has a softening temperature measured by the ring and ball method defined in the JIS K2207-1980 of 130° C. or more and 400° C. or less provided that it is non-transferable and maintains its membrane-making properties without becoming low-viscous when a coloring layer is coated on the intermediate layer formed on the substrate film and it is heated for printing. Among them, a resin which is incompatible with polycaprolactone-based resin is preferable, and examples include polyester resin, polybutadiene-based resin such as SBR resin, ABS resin, and SBS resin, maleic acid-based resin such as styrene-maleic anhydride copolymer, olefin-based resin, olefin-based copolymer, ionomer resin, and styrene-based resin.

When the binder resin has a softening temperature (the softening temperature measured by the ring and ball method defined in the JIS K2207-1980) below 130° C., it may be difficult to appropriately separate the binder resin and the thermally fusible substance in a process where a coating solution for forming an intermediate layer is coated on the substrate film and dried, and the effect caused by the fact that the thermally fusible substance is in a supercooled state cannot substantially be obtained, which makes it difficult to transfer all the necessary coloring layer to the transfer receiving material without lack of impression.

When the binder resin has a softening temperature (the softening temperature measured by the ring and ball method defined in the JIS K2207-1980) above 400° C., it has an excessive heat resistance and is highly expensive in most cases, which disadvantageously raises the manufacturing cost of thermal transfer films.

In the present invention, it is preferable that the intermediate glass transition temperature defined in the JIS K7121-1987 of the binder resin in the above-mentioned intermediate layer is higher than the fuse peak temperature (the fuse peak temperature defined in the JIS K7121-1987) of the thermally fusible substance by 2° C. or more, and the upper limit of the difference of the two temperatures is not specifically limited. However, when the temperature difference exceeds 100° C., the binder resin has an excessive heat resistance and is highly expensive in most cases, which disadvantageously raise the manufacturing cost of thermal transfer films.

When the intermediate glass transition temperature of the binder resin in the above-mentioned intermediate layer is not higher than the fuse peak temperature of the thermally fusible substance by 2° C. or more, it is difficult to appropriately separate the binder resin and the thermally fusible substance in a process where a coating solution for forming an intermediate layer is coated on the substrate film and dried, and the effect caused by the fact that the thermally fusible substance is in a supercooled state cannot substantially be obtained, which makes it difficult to transfer all the necessary coloring layer to the transfer receiving material without lack of impression.

Furthermore, the binder resin in the intermediate layer preferably has a number average molecular weight of 8,000 or more and 1,000,000 or less and especially preferably 8,000 or more and 100,000 or less.

When the number average molecular weight of the binder resin in the intermediate layer is below 8,000, it is difficult to appropriately separate the binder resin and the thermally fusible substance in a process where a coating solution for forming an intermediate layer is coated on the substrate film and dried, and the effect caused by the fact that the thermally fusible substance is in a supercooled state cannot substantially be obtained, which makes it difficult to transfer all the necessary coloring layer to the transfer receiving material without lack of impression. When the number average molecular weight of the binder resin in the intermediate layer is above 1,000,000, it is also difficult to appropriately separate the binder resin and the thermally fusible substance in a process where a coating solution for forming an intermediate layer is coated on the substrate film and dried, and the effect caused by the fact that the thermally fusible substance is in a supercooled state cannot substantially be obtained, which makes it difficult to transfer all the necessary coloring layer to the transfer receiving material without lack of impression.

When a carbon black is incorporated in the intermediate layer, it is difficult to read what has been printed from the thermal transfer film after printing (i.e., to read what has been printed by the thermal transfer film from a copy produced by copying the used coloring layer of the thermal transfer film after transfer by a copy machine), which can impart secret leakage preventing properties to the thermal transfer film.

When a carbon black is incorporated in the intermediate layer, the thermally fusible substance containing a carbon black preferably has a melt viscosity in the temperature range 15 to 25° C. higher than its fuse peak temperature of 100 mPa·s or more and 1000 mPa·s or less. Furthermore, for a thermal transfer film in which the binder resin incorporated in the intermediate layer forms a non-transferable porous membrane and the thermally fusible substance is contained in the pores, a carbon black is preferably located mainly within the porous membrane structure which is not thermally transferable made of the binder resin incorporated in the intermediate layer, in order to maintain the flowability of the thermally fusible substance on fusion in spite of the addition of a carbon black. Namely, it is preferable that carbon black is not located mainly in the thermally fusible substance contained in the pores.

In order for a carbon black to be located mainly within the porous membrane structure which is not thermally transferable made of the binder resin incorporated in the intermediate layer, a carbon black is preferably dispersed in the binder resin by usual methods in a sufficiently stable state, to which a solution of the thermally fusible substance is then added. The sufficiently stable state used herein refers to a state in which a dispersion of a carbon black in the binder resin does not substantially form a precipitate of a carbon black even after being allowed to stand at normal temperature for 100 days. A carbon black can be dispersed with an apparatus such a sand mill or a bead mill.

The intermediate layer may be produced by mixing the above-mentioned components with a dispersant, as occasion demand, such as a higher aliphatic alcohol, a phosphate and a metal salt thereof, an organic carboxylic acid and a derivative thereof, a low melting point wax, or various surfactants, dissolving or dispersing the mixture in a suitable solvent such as methyl ethyl ketone, toluene, alcohols, or water to prepare a coating solution, coating the coating solution by a conventional coating means such as a gravure coater, a roll coater, or a wire bar and drying the same.

The coating weight of the intermediate layer is preferably about 0.1 to 1.0 g/m$^2$ based on the dry solid content. When the coating weight is below 0.1 g/m$^2$, it is difficult to obtain a clear printing without lack of impression. On the other hand, when the coating weight is above 1.0 g/m$^2$, the intermediate layer is too thick and the printing sensitivity is undesirably decreased for transfer.

(Coloring Layer)

A coloring layer is formed on the above-mentioned intermediate layer in the present invention. The coloring layer is a thermally fusible ink layer and comprises a conventionally known colorant and binder, and also contains various additives, as occasion demand, such as a mineral oil, a vegetable oil, a higher fatty acid such as stearic acid, a plasticizer, an antioxidant, and a filler.

As a wax component used as the binder, for example, microcrystalline wax, carnauba wax, and paraffin wax may be mentioned. In addition, various waxes such as Fischer-Tropsch wax, various low-molecular-weight polyethylenes, Japan wax, bees wax, spermaceti wax, insect wax, wool wax, shellac wax, candelilla wax, petrolactam, polyester wax, partially modified waxes, fatty acid esters, and fatty acid amides are used. Among them, a wax with a melting point of 50 to 85° C. is preferable. When the melting point is below 50° C., the wax has poor storage properties and, when the melting point is above 85° C., the wax has insufficient sensitivity.

As a resin component used as the binder, for example, ethylene-vinyl acetate copolymer, ethylene-acrylate copolymer, polyethylene, polystyrene, polypropylene, polybutene, petroleum resin, vinyl chloride resin, vinyl chloride-vinyl acetate copolymer, polyvinyl alcohol, vinylidene chloride resin, methacrylate resin, polyamide, polycarbonate, fluorine resin, polyvinyl formal, polyvinyl butyral, acetyl cellulose, nitrocellulose, polyvinyl acetate, polyisobutyrene, ethylcellulose, or polyacetal may be mentioned, and a resin which has conventionally been used as a heat-sensitive adhesive and has a relatively low softening point, for example, of 50 to 80° C. is preferable.

As a colorant, a suitable colorant may be selected from known organic or inorganic pigments or dyes, and a colorant which has a sufficient color density and does not discolor or fade by light, heat and the like is preferable. A material which develops color by heat or on contact with a component coated on the surface of a transfer receiving material can also be used. The color of the colorant is not limited to cyan, magenta, yellow, or black, and colorants of various colors may be used.

Furthermore, a thermal conductive material may be incorporated as a filler in the binder in order to impart high thermal conductivity and thermofusion transferability to the coloring layer. As such a filler, carbonaceous material such as carbon black and metals and metal compounds such as aluminum, copper, tin oxide, and molybdenum disulfide may be mentioned.

The coloring layer may be produced by mixing the above-mentioned colorant component, the binder component, and various additives, as occasion demand, such as a mineral oil, a vegetable oil, a higher fatty acid such as stearic acid, a plasticizer, an antioxidant, and a filler, blending a solvent component such as water or an organic solvent to obtain a coloring layer-forming coating solution, and coating the same on an intermediate layer of a semi-lamination product which comprises a substrate film and the intermediate layer previously formed thereon by a conventionally known method such as hot-melt coating, hot lacquer coating, gravure coating, gravure reverse coating, or roll coating. An aqueous or nonaqueous emulsion coating solution may also be used.

The thickness of the coloring layer should be determined so as to balance the necessary printing concentration with the thermal sensitivity, and the thickness is preferably in the range of 0.5 to 8 g/m$^2$, and especially preferably in the range of 2.5 to 6 g/m$^2$.

Although the thermal transfer film of the present invention has an intermediate layer formed as described above and a good printing without lack of impression can be obtained on a rough paper, a better printing with even less lack of impression can be obtained on a rough paper when the melt viscosity of the coloring layer at 100° C. is 150 mPa·s or more and 300 mPa·s or less. When the melt viscosity of the coloring layer at 100° C. is below 150 mPa·s, no additional effect of reducing lack of impression on a rough paper can be obtained, and when the melt viscosity of the coloring layer at 100° C. is above 300 mPa·s, the coating suitability is reduced when the coloring layer is coated by hot-melt coating, which may make it difficult to coat the coloring layer with a good surface state.

The thermal transfer film of the present invention is adjusted such that the difference between the fuse peak temperature of the coloring layer (the fuse peak temperature defined in JIS K7121-1987) and the fuse peak temperature (the fuse peak temperature defined in JIS K7121-1987) of the thermally fusible substance is 10° C. or less, which enables a good printing with even less lack of impression to be obtained on a rough paper and reduces a phenomenon (entanglement phenomenon) in which a coloring layer adheres to the surface of a transfer receiving material as a thin layer without fusion. For example, when the fuse peak temperature of a thermally fusible substance is 60° C. and the fuse peak temperature of a coloring layer is 50° C. or more and 70° C. or less, the above-mentioned effect can be obtained. The smaller the temperature difference within 10° C., the more prominent the effect, and when the temperature difference is 0° C. the most preferable printing can be obtained. On the other hand, when the temperature difference exceeds 10° C., the effect of preventing the entanglement phenomenon cannot be fully shown.

(Heat Resistant Slipping Layer)

A heat resistant slipping layer may be formed on the other side of the substrate film in order to prevent sticking of the thermal head and improve slip. The heat resistant slipping layer is suitably prepared by adding a slipping agent, a surfactant, an inorganic particle, an organic particle, a pigment and the like to a binder resin.

As a binder resin used in the heat resistant slipping layer, for example, cellulose-based resin such as ethylcellulose, hydroxyethylcellulose, hydroxypropylcellulose, methycellulose, cellulose acetate, cellulose acetate butyrate, and cellulose nitrate, vinyl resin such as polyvinyl alcohol, polyvinyl acetate, polyvinyl butyral, polyvinyl acetal, polyvinyl pyrrolidone, acrylic resin, polyacrylamide, and acrylonitrile-styrene copolymer, polyester resin, polyurethane resin, and silicone-modified or fluorine-modified urethane resin may be mentioned. A resin which has several reactive groups, for example, hydroxyl group, is preferably selected from those resins and used in combination with a crosslinking agent such as polyisocyanate to obtain a crosslinked resin, which is preferably used.

The heat resistant slipping layer may be produced by mixing a binder resin with a slipping agent, a surfactant, an inorganic particle, an organic particle, a pigment and the like as mentioned above, dissolving or dispersing the mixture in a suitable solvent to prepare a coating solution, coating the coating solution by a conventional coating means such as a gravure coater, a roll coater, or a wire bar and drying the same.

Image Forming Method

The image forming method of the present invention comprises superimposing a transfer receiving material on the above-mentioned coloring layer side of a thermal transfer film of the present invention, heating and recording from the substrate film side according to the pixel by heating means, and separating the thermal transfer film and the transfer receiving material, wherein the time interval between recording the pixels and separating the thermal transfer film and the transfer receiving material is 2 seconds or less. When the time interval between recording the pixels to separating the thermal transfer film and the transfer receiving material is above 2 seconds, the thermally fusible substance, which has been melted in a low viscosity by the heat for printing, solidifies or increases in viscosity as the temperature decreases, even if the thermally fusible substance has supercooling properties, which generates lack of impression and makes it difficult to obtain a clear printing.

Any conventionally known method which can control the heating value according to the image information from a computer can be used as heating means in the above-mentioned image forming method. For example, a thermal head which is used in a word processor, a facsimile and the like, and a laser head which is used in a laser printing printer, can be used. Furthermore, an electric heating fusion transfer-type electric head can be used when an electric heating layer is formed on the back side of a thermal transfer film.

When a thermal head is used as heating means, a so-called entire surface glaze-type thermal head or a partial glaze-type thermal head, which have heating elements in planar regions, not at end faces, on substrates such as alumina, are preferably used because those thermal heads are substantially cheaper than an end face-type thermal head described below, which allows production of less expensive image forming devices. When an entire surface glaze-type thermal head or a partial glaze-type thermal head is used, it is difficult to provide space for separating a thermal transfer film from a transfer receiving material immediately after recording each pixel because a region for forming a common electrode and a seat for supporting a substrate such as alumina are present on the heating element in a width of about 1 mm to 10 mm downstream with reference to the feed direction of the thermal transfer film in such thermal heads. Therefore, the thermal transfer film is separated from the transfer receiving material only after each region in the thermal transfer film where the pixels have been recorded by heating by the thermal head travels downstream with reference to the feed direction of the thermal transfer film and reaches the end of the substrate.

When the image forming method of the present invention is carried out by using an image forming device employing the above-mentioned entire surface glaze-type thermal head or partial glaze-type thermal head, the minimum time needed for feeding each region where the pixels have been recorded by heating by the thermal head downstream with reference to the feed direction of the thermal transfer film to the end of the substrate is the lower limit of the time needed till separating the thermal transfer film and the transfer receiving material. Therefore, the time needed till separating the thermal transfer film and the transfer receiving material can be 2 seconds or less by adjusting the feed speed when the thermal transfer film is fed continuously or the suspension time and the feed speed when the thermal transfer film is fed intermittently.

On the other hand, when the image forming method of the present invention is carried out by using an image forming device employing the above-mentioned entire surface glaze-type thermal head or partial glaze-type thermal head, it is difficult to vanish the time needed till separating the thermal transfer film and the transfer receiving material for the reason mentioned above. It is necessary to separate the thermal transfer film and the transfer receiving material immediately after the recording of each pixel in order to vanish the time needed till separation when a thermal head is used as heating means. Such a separation is possible when a so-called end face-type thermal head, which has heating elements formed at the end face of a substrate such as alumina, is used.

In the present invention, the energy for heating and recording in the image formation can be appropriately adjusted in view of the melting point of the thermally fusible substance used in the intermediate layer composing the thermal transfer film of the present invention.

It is needless to say that the thermal transfer film of the present invention can be adapted for color printing, and a multicolored thermal transfer film is also included in the present invention.

The thermal transfer film of the present invention is not limited by the above-mentioned embodiments of the invention.

Incidentally, any conventionally known transfer receiving material can be used as a transfer receiving material for use in combination with the thermal transfer film of the present invention.

EXAMPLES

The present invention will next be described in more detail with reference to examples and comparative examples. Parts and percentages are based on weights unless otherwise noted.

Example 1

Preparation of Samples 1 to 12

A polyethylene terephthalate film with a thickness of 4.5 $\mu$m (manufactured by Toray Corporation) was used as a substrate film, and an intermediate layer coating solution with each composition shown in Table 1 below was coated by gravure coating at each coating weight shown in Table 1 below on the substrate film, which was dried by a hot wind at 100° C. and then wound. The melt viscosity was measured with the device described below under the measurement conditions described below.

Name of device: Viscoelasticity measurement device Rotovisco RV20 (manufactured by HAKKE)

Measurement head: M5

Sensor system: Sensor system cone plate PK5

(aperture angle 0.5°, radius of cone plate 25 mm)

(Temperature setting: two temperatures which are 15° C. and 25° C. higher than the fuse peak temperature of the thermally fusible substance)

Subsequently, a coloring layer coating solution with the following composition heated at 100° C. was coated on each intermediate layer by hot-melt coating at a dry coating weight of 4 g/m$^2$ to form a coloring layer to prepare a thermal transfer film (Samples 1 to 9).

A heat resistant slipping layer coating solution with the following composition was coated with a roll coater on the other side of the thermal transfer film and the film was dried to form a heat resistant slipping layer at a dry coating weight of 0.10 g/m$^2$ g$^2$ beforehand.

| <Coloring layer coating solution> | |
|---|---|
| Carbon black (average particle diameter of 40 nm, manufactured by Mitsubishi Chemical Co., Ltd.) | 15 parts |
| Ethylene-vinyl acetate copolymer (Sumitate HC10, manufactured by Sumitomo Chemical Co., Ltd.) | 9 parts |
| Carnauba wax (manufactured by Kato Yoko Corporation) | 38 parts |
| Paraffin wax (155° F., manufactured by Nippon Seiro Co., Ltd.) | 38 parts |
| <Heat resistant slipping layer coating solution> | |
| Polyvinyl butyral resin (manufactured by Sekisui Chemical Co., Ltd., S-Lec BX-1) | 20 parts |
| Talc (manufactured by Nippon Talc Co., Ltd., Microace L-1) | 30 parts |
| Melamine resin fine particle (manufactured by Nippon Shokubai Co., Ltd., Epostar S) | 30 parts |
| Polyisocyanate (manufactured by Takeda Chemical Industries, Ltd., Takenate A-3) | 40 parts |
| Toluene/methyl ethyl ketone (weight ratio of 1/1) | 900 parts |

TABLE 1

| Thermal transfer film | Thermally fusible substance Type | Parts by weight | Fuse peak Temperature A (° C.) | Melt visocity at fuse peak temperature + 15° C. (mPa · s) | Melt viscosity at fuse peak temperature + 25° C. (mPa · s) | Crystallization Peak Temperature B (° C.) | Temperature Differnce Between A and B (° C.) | Number Average Molecular weight |
|---|---|---|---|---|---|---|---|---|
| Sample 1 | (1) | 50 | 57 | 220 | 150 | 33 | 24 | 4,000 |
| Sample 2 | (2) | 50 | 55 | 590 | 430 | 28 | 27 | 2,000 |
| Sample 3 | (3) | 50 | 55 | 900 | 650 | 28 | 27 | 3,000 |
| Sample 4 | (2) | 50 | 55 | 590 | 430 | 28 | 27 | 2,000 |
| Sample 5 | (2) | 50 | 55 | 590 | 430 | 28 | 27 | 2,000 |
| Sample 6 | (2) | 50 | 55 | 590 | 430 | 28 | 27 | 2,000 |
| Sample 7 | (2) | 25 | 55 | 590 | 430 | 28 | 27 | 2,000 |
| Sample 8 | (2) | 50 | 55 | 590 | 430 | 28 | 27 | 2,000 |
| Sample 9 | (2) | 25 | 55 | 590 | 430 | 28 | 27 | 2,000 |
| Sample 10 | (20) | 25 | 68 | 290 | 200 | −1 | 69 | 2,000 |
| Sample 11 | (20) | 50 | 68 | 290 | 200 | −1 | 69 | 2,000 |
| Sample 12 | (20) | 25 | 68 | 290 | 200 | −1 | 69 | 2,000 |

| Thermal transfer film | Binder resin Type | Solid content in parts by weight | Intermediate glass transition temperature (° C.) | Softening temperature (° C.) | Number average molecular weight | Carbon black Type | Carbon black Parts by weight | Solvent Type | Solvent Parts by weight | Coating weight (g/m$^2$) |
|---|---|---|---|---|---|---|---|---|---|---|
| Sample 1 | (11) | 50 (Note 1) | 77 | 140 | 8,000 | — | — | Water | 900 | 0.5 |
| Sample 2 | (12) | 50 | 47 | 155 | 14,000–17,000 | — | — | Toluene | 900 | 0.5 |
| Sample 3 | (13) | 50 | 100 | 180 | 10,000 | — | — | Toluene | 900 | 0.5 |

TABLE 1-continued

| | | | | | | | | | | |
|---|---|---|---|---|---|---|---|---|---|---|
| Sample 4 | (13) | 50 | 100 | 180 | 10,000 | — | — | Toluene | 900 | 0.5 |
| Sample 5 | (14) | 50 | 67 | 163 | 15,000–20,000 | — | — | Toluene | 900 | 0.5 |
| Sample 6 | (15) | 50 | 72 | 180 | 20,000–25,000 | — | — | Toluene | 900 | 0.5 |
| Sample 7 | (14) | 50 | 67 | 163 | 15,000–20,000 | (9) | 25 | Toluene | 900 | 0.5 |
| Sample 8 | (14) | 25 | 67 | 163 | 15,000–20,000 | (9) | 25 | Toluene | 900 | 0.5 |
| Sample 9 | (14) | 30 | 67 | 163 | 15,000–20,000 | (9) | 25 | Toluene | 900 | 0.5 |
| Sample 10 | (14) | 50 | 67 | 163 | 15,000–20,000 | (9) | 25 | Toluene | 900 | 0.5 |
| Sample 11 | (14) | 25 | 67 | 163 | 15,000–20,000 | (9) | 25 | Toluene | 900 | 0.5 |
| Sample 12 | (14) | 30 | 67 | 163 | 15,000–20,000 | (9) | 25 | Toluene | 900 | 0.5 |

Note 1: MD-1500, type (11) of binder resin, is an aqueous dispersion of a polyester resin and an appropriate quantity was used to obtain the solid content of the predetermined parts by weight.

The types of thermally fusible substances, binder resins, and carbon blacks used are listed below.

(1) Polyethylene glycol #4000 (Sanyo Chemical Industries, Ltd.)

(2) Placcel 220 (polycaprolactone diol, manufactured by Daicel Chemical Industries, Ltd.)

(3) Placcel 230 (polycaprolactone diol, manufactured by Daicel Chemical Industries, Ltd.)

(4) Placcel 205 (polycaprolactone diol, manufactured by Daicel Chemical Industries, Ltd.)

(5) Placcel 210 (polycaprolactone diol, manufactured by Daicel Chemical Industries, Ltd.)

(6) Placcel 240 (polycaprolactone diol, manufactured by Daicel Chemical Industries, Ltd.)

(7) Placcel H1P (polycaprolactone, manufactured by Daicel Chemical Industries, Ltd.)

(8) Placcel 320 (polycaprolactone triol, manufactured by Daicel Chemical Industries, Ltd.)

(9) Mixture of Placcel H1P/Placcel 220 (weight ratio of 2/1)

(10) Dicyclohexyl phthalate

(11) Vylonal MD-1500 (aqueous dispersion of polyester, manufactured by Toyobo Co., Ltd.)

(12) Vylon 600 (manufactured by Toyobo Co., Ltd.)

(13) Polystyrene (number average molecular weight, 10,000)

(14) Vylon 200 (manufactured by Toyobo Co., Ltd.)

(15) Vylon 290 (manufactured by Toyobo Co., Ltd.)

(16) Carnauba #2 (carnauba wax, manufactured by Noda Wax)

(17) Vylonal MD-1930 (aqueous dispersion of polyester, manufactured by Toyobo Co., Ltd.)

(18) Carbon black (average particle diameter 40 nm, manufactured by Mitsubishi Chemical Co., Ltd.)

(19) Stearic acid (manufactured by Tokyo Kasei Kogyo Co., Ltd.)

(20) Thermally fusible polyester

Preparation of Comparative Samples 1 to 18

Thermal transfer films (comparative Samples 1 to 18) were prepared in the same manner as for the above-mentioned Samples 1 to 9 except that the composition of the intermediate layer coating solution was changed to compositions shown in Tables 2, 3, or 4 and the intermediate layer coating solution was coated at each coating weight shown in Tables 2, 3, or 4.

TABLE 2

| Thermal transfer film | Thermally fusible substance | | | | | | | |
|---|---|---|---|---|---|---|---|---|
| | Type | Parts by weight | Fuse peak Temperature A (° C.) | Melt visocity at Fuse peak temperature + 15° C. (mPa · s) | Melt viscosity at fuse peak temperature + 25° C. (mPa · s) | Crystallization Peak Temperature B (° C.) | Temperature Differnce Between A and B (° C.) | Number Average Molecular weight |
| Comparative sample 1 | (4) | 100 | 32 | 120 | 90 | 8 | 24 | 500 |
| Comparative sample 2 | (5) | 100 | 47 | 220 | 160 | 21 | 26 | 1,000 |
| Comparative sample 3 | (2) | 100 | 55 | 590 | 430 | 28 | 27 | 2,000 |
| Comparative sample 4 | (6) | 100 | 56 | 1,900 | 1,200 | 31 | 25 | 4,000 |
| Comparative sample 5 | (7) | 100 | 60 | 350,000 | 150,000 | 31 | 29 | 10,000 |
| Comparative sample 6 | (8) | 100 | 42 | 700 | 450 | 18 | 24 | 2,000 |
| Comparative sample 7 | (7) | 30 | 60 | 350,000 | 150,000 | 31 | 29 | 10,000 |

| Thermal transfer film | Binder resin | | | | | Carbon black | | Solvent | | Coating weight (g/m²) |
|---|---|---|---|---|---|---|---|---|---|---|
| | Type | Solid content in parts by weight | Intermediate glass transition temperature (° C.) | Softening temperature (° C.) | Number average molecular weight | Type | Parts by weight | Type | Parts by weight | |
| Comparative sample 1 | — | — | — | — | — | — | — | Water | 900 | 0.5 |

TABLE 2-continued

| | | | | | | | | | | |
|---|---|---|---|---|---|---|---|---|---|---|
| Comparative sample 2 | — | — | — | — | — | — | — | Toluene | 900 | 0.5 |
| Comparative sample 3 | — | — | — | — | — | — | — | Toluene | 900 | 1.0 |
| Comparative sample 4 | — | — | — | — | — | — | — | Toluene | 900 | 1.0 |
| Comparative sample 5 | — | — | — | — | — | — | — | Toluene | 900 | 1.0 |
| Comparative sample 6 | — | — | — | — | — | — | — | Toluene | 900 | 1.0 |
| Comparative sample 7 | (14) | 70 | 67 | 163 | 15,000–20,000 | — | — | Toluene | 900 | 0.5 |

TABLE 3

| | Thermally fusible substance | | | | | | | |
|---|---|---|---|---|---|---|---|---|
| Thermal transfer film | Type | Parts by weight | Fuse peak Temperature A (° C.) | Melt viscosity at Fuse peak temperature + 15° C. (mPa · s) | Melt viscosity at fuse peak temperature + 25° C. (mPa · s) | Crystallization Peak Temperature B (° C.) | Temperature Diffrence Between A and B (° C.) | Number Average Molecular weight |
| Comparative sample 8 | (7) | 30 | 60 | 350,000 | 150,000 | 31 | 29 | 10,000 |
| Comparative sample 9 | (2) | 30 | 55 | 590 | 430 | 28 | 27 | 2,000 |
| Comparative sample 10 | (9) | 100 | 60 | 300,000 | 100,000 | 30 | 30 | 8,000 |
| Comparative sample 11 | (7) | 100 | 60 | 3,000,000 | 2,100,000 | 31 | 29 | 70,000 |
| Comparative sample 12 | (4) | 75 | 32 | 120 | 90 | 8 | 24 | 530 |
| Comparative sample 13 | (6) | 75 | 56 | 1,900 | 1,200 | 31 | 25 | 4,000 |

| | Binder resin | | | | | | | | | |
|---|---|---|---|---|---|---|---|---|---|---|
| Thermal transfer film | Type | Solid content in parts by weight | Intermediate glass transition temperature (° C.) | Softening Temperature (° C.) | Number Average Molecular weight | Carbon black Type | Carbon black Parts by weight | Solvent Type | Solvent Parts by weight | Coating weight (g/m$^2$) |
| Comparative sample 8 | (16) | 70 | — | 75 | — | — | — | Water | 900 | 1.0 |
| Comparative sample 9 | (16) | 70 | — | 75 | — | — | — | Toluene | 900 | 1.0 |
| Comparative sample 10 | — | — | — | — | — | — | — | Toluene | 900 | 1.0 |
| Comparative sample 11 | — | — | — | — | — | — | — | Toluene | 900 | 2.0 |
| Comparative sample 12 | (12) | 25 | 47 | 155 | 14,000–17,000 | — | — | Toluene | 900 | 0.5 |
| Comparative sample 13 | (12) | 25 | 47 | 155 | 14,000–17,000 | — | — | Toluene | 900 | 0.5 |

TABLE 4

| | Thermally fusible substance | | | | | | | |
|---|---|---|---|---|---|---|---|---|
| Thermal Transfer film | Type | Parts by weight | Fuse peak Temperature A (° C.) | Melt viscosity at fuse peak temperature + 15° C. (mPa · s) | Melt viscosity at fuse peak temperature + 25° C. (mPa · s) | Crystallization Peak Temperature B (° C.) | Temperature Diffrence Between A and B (° C.) | Number average molecular weight |
| Comparative sample 14 | (4) | 75 | 32 | 120 | 90 | 8 | 24 | 530 |
| Comparative sample 15 | (6) | 75 | 56 | 1,900 | 1,200 | 31 | 25 | 4,000 |
| Comparative sample 16 | (10) | 75 | 57 | 310 | 210 | −4 | 61 | 332 |
| Comparative sample 17 | (1) | 75 | 57 | 220 | 150 | 33 | 24 | 4,000 |
| Comparative | (19) | 75 | 70 | 8 | 5 | 67 | 3 | 284 |

TABLE 4-continued sample 18

| Thermal transfer film | Binder resin Type | Solid content in parts by weight | Intermediate glass transition temperature (° C.) | Softening temperature (° C.) | Number average molecular weight | Carbon black Type | Carbon black Parts by weight | Solvent Type | Solvent Parts by weight | Coating weight (g/m$^2$) |
|---|---|---|---|---|---|---|---|---|---|---|
| Comparative sample 14 | (14) | 25 | 67 | 163 | 15,000–20,000 | — | — | Toluene | 900 | 0.5 |
| Comparative sample 15 | (14) | 25 | 67 | 163 | 15,000–20,000 | — | — | Toluene | 900 | 0.5 |
| Comparative sample 16 | (14) | 25 | 67 | 163 | 15,000–20,000 | — | — | Toluene | 900 | 0.5 |
| Comparative sample 17 | (17) | 25 (Note 1) | −10 | 110 | 15,000–20,000 | — | — | Water | 900 | 0.5 |
| Comparative sample 18 | (14) | 25 | 67 | 163 | 15,000–20,000 | — | — | Toluene | 900 | 0.5 |

Note 1: MD-1930, type (17) of binder resin, is an aqueous dispersion of a polyester resin and an appropriate quantity was used to obtain the solid content of the predetermined parts by weight.

The types of thermally fusible substances, binder resins, and carbon blacks used are listed above.

Evaluation

The thermal transfer films obtained in the above-mentioned manner (Samples 1 to 9 and comparative examples 1 to 18) were evaluated for coating suitability of intermediate layer, coating suitability of coloring layer, printing quality, and secret leakage preventing properties by the following evaluation methods.

<Coating Suitability of Intermediate Layer>

Coating suitability of the intermediate layer on a substrate film was evaluated according to the following criteria.

A: The intermediate layer was found to be tack-free on finger-touching after being dried to remove the solvent, and the substrate film side did not adhere to the intermediate layer side by the tack of the intermediate layer after the thermal transfer film was wound.

B: The intermediate layer was found to be slightly tacky on finger-touching after being dried to remove the solvent, but the substrate film side did not adhere to the intermediate layer side by the tack of the intermediate layer after the thermal transfer film was wound.

C: The intermediate layer was found to be tacky on finger-touching after being dried to remove the solvent, and the substrate film side adhered to the intermediate layer side by the tack of the intermediate layer after the thermal transfer film was wound.

<Coating Suitability of Coloring Layer>

Coating suitability of the coloring layer coating solution on the intermediate layer was evaluated according to the following criteria.

A: The coloring layer coating solution was coated as stably and evenly as when the coloring layer coating solution was coated directly on a substrate film.

B: The coloring layer coating solution was coated unevenly as compared to when the coloring layer coating solution was coated directly on a substrate film.

C: The coloring layer coating solution was coated too unevenly to allow practical use as the thermal transfer film.

<Printing Quality>

The above-mentioned thermal transfer films were provided for printing on a printer paper (#4024, a Beck smoothness of 32 seconds) manufactured by Xerox Corporation by using a facsimile (Telecopier 7033) manufactured by Fuji Xerox Co., Ltd. operated in the copy mode.

The printed paper was visually inspected for breaks of letters and fine lines due to lack of impression and evaluated according to the following criteria.

A: Virtually no break of letters and fine lines due to lack of impression was observed, and an extremely good printing was obtained.

B: Little breaks of letters and fine lines due to lack of impression was observed, but a good printing was obtained.

C: Much breaks of letters and fine lines due to lack of impression was observed, and a patchy printing with broken letters and fine lines was obtained.

D: Remarkable breaks of letters and fine lines due to lack of impression was observed, and a remarkably patchy printing with broken letters and broken fine lines was obtained.

<Secret Leakage Preventing Properties>

The coloring layer side of the thermal transfer film, which had been provided for printing under the same printing conditions as the above-mentioned printing quality test, was copied to a copy paper (WR-100) manufactured by Fuji Xerox Co., Ltd. by a copy machine (Vivace 675) manufactured by Fuji Xerox Co., Ltd. The print density was adjusted "automatically". The image printed on the copy paper was visually inspected to see if the original printed matter printed by using the thermal transfer film could be read and evaluated according to the following criteria.

A: The original printed matter could not be read.

B: Most of the original printed matter could not be read.

C: The original printed matter could be easily read.

(Evaluation Results)

Evaluation results are shown in Table 5.

TABLE 5

| Thermal transfer film | Coating Suitability of intermediate layer | Coating suitability of coloring layer | Printing quality | Secret leakage preventing properties |
|---|---|---|---|---|
| Sample 1 | A | A | A | C |
| Sample 2 | B | A | A | C |
| Sample 3 | A | A | B | C |
| Sample 4 | A | A | B | C |
| Sample 5 | A | A | A | C |

TABLE 5-continued

| Thermal transfer film | Coating Suitability of intermediate layer | Coating suitability of coloring layer | Printing quality | Secret leakage preventing properties |
|---|---|---|---|---|
| Sample 6 | A | A | A | C |
| Sample 7 | A | A | A | B |
| Sample 8 | A | A | A | B |
| Sample 9 | A | A | A | A |
| Sample 10 | A | A | A | B |
| Sample 11 | A | A | A | B |
| Sample 12 | A | A | A | A |
| Comparative sample 1 | C | C | D | C |
| Comparative sample 2 | C | C | D | C |
| Comparative sample 3 | C | C | D | C |
| Comparative sample 4 | C | C | D | C |
| Comparative sample 5 | C | B | D | C |
| Comparative sample 6 | C | C | D | C |
| Comparative sample 7 | A | A | D | C |
| Comparative sample 8 | C | C | D | C |
| Comparative sample 9 | C | C | D | C |
| Comparative sample 10 | C | B | D | C |
| Comparative sample 11 | C | B | D | C |
| Comparative sample 12 | C | C | C | C |
| Comparative sample 13 | C | C | C | C |
| Comparative sample 14 | B | C | C | C |
| Comparative sample 15 | B | A | C | C |
| Comparative sample 16 | C | C | C | C |
| Comparative sample 17 | C | C | C | C |
| Comparative sample 18 | C | C | C | C |

As shown in Table 5, any of the thermal transfer films (Samples 1 to 12), which used a thermally fusible substance which had a melt viscosity in the temperature range 15 to 25° C. higher than the fuse peak temperature (the fuse peak temperature defined in JIS K7121-1987) in the range of 100 mPa·s and 1000 mPa·s, a fuse peak temperature (the fuse peak temperature defined in JIS K7121-1987) in the range of 50 to 110° C., and a crystallization peak temperature (the crystallization peak temperature defined in JIS K7121-1987) in the range of −20 to 100° C., wherein the crystallization peak temperature is lower than the fuse peak temperature by 10° C. to 100° C., and which used a binder resin which was non-transferable and had a softening temperature (the softening temperature measured by the ring and ball method defined in the JIS K2207-1980) in the range of 130° C. to 400° C., had practical levels of coating suitability of intermediate layer, coating suitability of coloring layer, and printing quality. Furthermore, it was found that the thermal transfer films (Samples 7 to 12), which contained a carbon black in the intermediate layer, had also excellent secret leakage preventing properties.

In contrast, the thermal transfer films (comparative Samples 1, 4, 5, 7, 8, 10 to 15) which employed thermally fusible substances having a melt viscosity in the temperature range 15 to 25° C. higher than the fuse peak temperature out of the range of 100 mPa·s to 1000 mPa·s, the thermal transfer films (comparative Samples 1 to 6, 10, and 11) which did not contain binder resins in the intermediate layers, the thermal transfer films (comparative Samples 8, 9, and 17) which contained binder resins having a softening temperature (the softening temperature measured by the ring and ball method defined in the JIS K2207-1980) below 130° C., and the thermal transfer film (comparative Sample 18) which contained a thermally fusible substance having a fuse peak temperature higher than the crystallization peak by below 10° C. in the intermediate layer did not reach the practical level of at least one categories of coating suitability of intermediate layer, coating suitability of coloring layer; or printing quality.

Subsequently, the thermal transfer film prepared in the above-mentioned manner (Sample 9) was provided for printing on a printer paper (#4024, a Beck smoothness of 32 seconds) manufactured by Xerox Corporation by using a test printer employing a partial glaze-type thermal head (KF2008-GH14, applied voltage 24 V) manufactured by Rohm Co., Ltd. at a printing speed of 10 ms/line under 12 kinds of printing conditions (printing conditions 1 to 8, comparative printing conditions 1 to 4) which are combinations of separation times and applied energy shown in Table 6

The applied energy was adjusted by changing the duration of pulses and the separation time was adjusted by changing the distance from the center position of heating elements of the thermal head to the separation position.

The printing quality was evaluated according to the same criteria as mentioned above.

(Evaluation Results)

Evaluation results are shown in Table 6.

TABLE 6

| Printing conditions | Separation time (sec.) | Applied energy ($mJ/mm^2$) | Printing quality |
|---|---|---|---|
| Printing condition 1 | 0.1 | 5 | B |
| Printing condition 2 | 0.1 | 15 | A |
| Printing condition 3 | 0.1 | 30 | A |
| Printing condition 4 | 0.1 | 40 | B |
| Printing condition 5 | 1.5 | 5 | B |
| Printing condition 6 | 1.5 | 15 | A |
| Printing condition 7 | 1.5 | 30 | A |
| Printing condition 8 | 1.5 | 40 | B |
| Comparative printing condition 1 | 3 | 5 | D |
| Comparative printing condition 2 | 3 | 15 | C |
| Comparative printing condition 3 | 3 | 30 | C |
| Comparative printing condition 4 | 3 | 40 | D |

As shown in Table 6, the printing qualities obtained under the printing conditions 1 to 8 where the time interval between recording each pixel and separating the thermal transfer film and the printer paper was 2 seconds or less were good. Among these printing conditions, better printing qualities were obtained when the appropriate printing energy with reference to the thermally fusible substance used was applied (printing conditions 2, 3, 6, and 7).

In contrast, the printing qualities obtained under comparative printing conditions 1 to 4 where the time interval between recording each pixel and separating the thermal transfer film and the printer paper was above 2 seconds were poor at any printing energy.

Measurement head: M5

Sensor system: Sensor system cone plate PK5 (aperture angle 0.5°, radius of cone plate 25 mm, temperature setting 100° C.)

TABLE 7

| | Coloring layer coating solution I | Coloring layer coating solution II | Coloring layer coating solution III | Coloring layer coating solution IV | Coloring layer coating solution V |
|---|---|---|---|---|---|
| Carbon black (1) | 18 parts | 18 parts | 18 parts | 18 parts | 18 parts |
| Ethylene-vinyl acetate copolymer (2) | | | | | 11 parts |
| Ethylene-vinyl acetate copolymer (3) | | | 11 parts | | |
| Ethylene-vinyl acetate copolymer (4) | | 11 parts | | | |
| Ethylene-vinyl acetate copolymer (5) | 11 parts | | | | |
| Ethylene-vinyl acetate copolymer (6) | | | | 9 parts | |
| Carnauba wax (7) | 10 parts | 10 parts | 10 parts | 10 parts | 10 parts |
| Paraffin wax (8) | 61 parts | 61 parts | 61 parts | 61 parts | 61 parts |
| Melt viscosity at 100° C. (mPa · s) | 160 | 210 | 280 | 120 | 320 |

Example 2

Preparation of Samples 2-1 to 2-5

A polyethylene terephthalate film with a thickness of 4.5 μm (manufactured by Toray Corporation) was used as a substrate film, and an intermediate layer coating solution with the following composition was coated by gravure coating at a coating weight of 0.5 g/m$^2$ on the substrate film, which was dried by a hot wind at 100° C. and then wound.

| <Intermediate layer coating solution> | |
|---|---|
| Thermally fusible substance | 20 parts |
| (Placcel 220, manufactured by Daicel Chemical Industries, Ltd.) | |
| (fuse peak temperature: 55° C., crystallization peak temperature: 28° C.) | |
| (melt viscosity at 70° C.: 590 mPa · s) | |
| (melt viscosity at 80° C.: 430 mPa · s) | |
| (number average molecular weight: 2,000) | |
| Binder resin (polyester resin) | 60 parts |
| (Vylon 200, manufactured by Toyobo Co., Ltd.) | |
| (softening temperature: 163° C., intermediate glass transition temperature: 67° C.) | |
| (number average molecular weight: 15,000 to 20,000) | |
| Carbon black | 20 parts |
| (average particle diameter 40 nm, manufactured by Mitsubishi Chemical Co., Ltd.) | |
| Toluene | 900 parts |

Subsequently, each of five kinds of coloring layer coating solutions (I to v) with the following composition shown in Table 7 heated at 120° C. was coated on the intermediate layer by hot-melt coating in a dry thickness of 4.5 μm to form a coloring layer to prepare a thermal transfer film (Samples 2-1 to 2-5). The melt viscosity of the coloring layer at 100° C. was measured and shown in Table 7. The melt viscosity was measured with the device described below under the measurement conditions described below.

Name of device: Viscoelasticity measurement device Rotovisco RV20 (manufactured by HAKKE)

The components used are as follows.

(1) Carbon black (average particle diameter of 40 nm, manufactured by Mitsubishi Chemical Co., Ltd.)

(2) Ethylene-vinyl acetate copolymer (Sumitate HA-10, manufactured by Sumitomo Chemical Co., Ltd.)

(3) Ethylene-vinyl acetate copolymer (Sumitate DB-10, manufactured by Sumitomo Chemical Co., Ltd.)

(4) Ethylene-vinyl acetate copolymer (Sumitate KC-10, manufactured by Sumitomo Chemical Co., Ltd.)

(5) Ethylene-vinyl acetate copolymer (Sumitate HE-10, manufactured by Sumitomo Chemical Co., Ltd.)

(6) Ethylene-vinyl acetate copolymer (NUK-3160, manufactured by Nippon Unicar Co., Ltd.)

(7) Carnauba wax (manufactured by Kato Yoko Corporation)

(8) Paraffin wax (Paraffin Wax-140, manufactured by Nippon Seiro Co., Ltd.)

A heat resistant slipping layer coating solution with the following composition was coated with a roll coater on the other side of the thermal transfer film and the film was dried to form a heat resistant slipping layer in a dry thickness of 0.1 μm beforehand.

| <Heat resistant slipping layer coating solution> | |
|---|---|
| Polyvinyl butyral resin | 20 parts |
| (manufactured by Sekisui Chemical Co., Ltd., S-Lec BX-1) | |
| Talc | 30 parts |
| (manufactured by Nippon Talc Co., Ltd., Microace L-1) | |
| Melamine resin fine particle | 30 parts |
| (manufactured by Nippon Shokubai Co., Ltd., Epostar S) | |

-continued

| <Heat resistant slipping layer coating solution> | |
|---|---|
| Polyisocyanate (manufactured by Takeda Chemical Industries, Ltd., Takenate A-3) | 40 parts |
| Toluene/methyl ethyl ketone (weight ratio of 1/1) | 900 parts |

The thermal transfer films obtained in the above-mentioned manner (Samples 2-1 to 2-5) were evaluated for coating suitability of intermediate layer, coating suitability of coloring layer, printing quality, and secret leakage preventing properties. The coating suitability of intermediate layer and secret leakage preventing properties were evaluated in the same manner as in Example 1 and the coating suitability of coloring layer and printing quality were evaluated by the following evaluation methods.

<Coating Suitability of Coloring Layer>

Coating suitability of the coloring layer coating solution on the intermediate layer was observed for the appearance of the coloring layer after coating and evaluated according to the following criteria. The coloring layer was observed with a stereoscopic microscope of a magnification of 10 to 20 times.

A: No streaked irregularity of coating was observed with a stereoscopic microscope, and a uniform surface without irregularity of coating was obtained.

B: Streaked irregularity of coating was observed with a stereoscopic microscope and an uneven surface with irregularity of coating surface was obtained.

C: Much streaked irregularity of coating or streaked area left uncoated with the coloring layer were visually observed and an uneven surface was obtained.

<Printing Quality>

The above-mentioned thermal transfer films were provided for printing on a printer paper (#4024, a Beck smoothness of 32 seconds) manufactured by Xerox Corporation by using a facsimile (Telecopier 7033) manufactured by Fuji Xerox Co., Ltd. operated in the copy mode.

The printed paper was visually inspected for break of letters and fine lines due to lack of impression and evaluated according to the following criteria.

A: Virtually no break of letters and fine lines due to lack of impression was observed, and an extremely good printing was obtained.

B: Little break of letters and fine lines due to lack of impression was observed, but a good printing was obtained.

C: Much break of letters and fine lines due to lack of impression was observed, and a patchy printing with broken letters and broken fine lines was obtained.

(Evaluation Results)

Evaluation results are shown in Table 8 below.

TABLE 8

| Thermal transfer film | Coloring Layer Coating solution | Evaluation results: Coating suitability of intermediate layer | Coating suitability of coloring layer | Printing quality | Secret leakage preventing properties |
|---|---|---|---|---|---|
| Sample 2-1 | I | A | A | A | B |
| Sample 2-2 | II | A | A | A | B |
| Sample 2-3 | III | A | A | A | B |
| Sample 2-4 | IV | A | A | B | B |
| Sample 2-5 | V | A | A | B | B |

As shown in Table 8, the thermal transfer films (Samples 2-1 to 2-3), which had coloring layers with a melt viscosity at 100° C. in the range of 150 to 300 mPa·s, were found to satisfy all the requirements of coating suitability of intermediate layer, coating suitability of coloring layer, printing quality, and secret leakage preventing properties.

In contrast, the thermal transfer films (Samples 2-4 and 2-5), which had coloring layers with a melt viscosity at 100° C. out of the range of 150 to 300 mPa·s, were found to have good coating suitability of intermediate layer, coating suitability of coloring layer, and secret leakage preventing properties, but had poorer printing quality than that of the above-mentioned thermal transfer films (Samples 2-1 to 2-3).

Examples 3-1 to 3-5

Preparation of Samples 3-1 to 3-5

A polyethylene terephthalate film with a thickness of 4.5 μm (manufactured by Toray Corporation) was used as a substrate film, and an intermediate layer coating solution with the following composition was coated by gravure coating at a coating weight of 0.5 g/$m^2$ on the substrate film, which was dried by a hot wind at 100° C. and then wound.

| <Intermediate layer coating solution> | |
|---|---|
| Thermally fusible substance (Placcel 220, manufactured by Daicel Chemical Industries, Ltd.) (fuse peak temperature: 55° C., crystallization peak temperature: 28° C.) (melt viscosity at 70° C.: 590 mPa · s) (melt viscosity at 80° C.: 430 mPa · s) (number average molecular weight: 2,000) | 20 parts |
| Binder resin (polyester resin) (Vylon 200, manufactured by Toyobo Co., Ltd.) (softening temperature: 163° C., intermediate glass transition temperature: 67° C.) (number average molecular weight: 15,000 to 20,000) | 60 parts |
| Carbon black (average particle diameter 40 nm, manufactured by Mitsubishi Chemical Co., Ltd.) | 20 parts |
| Toluene | 900 parts |

Subsequently, each of five kinds of coloring layer coating solutions (1 to 5) with the following composition shown in Table 9 heated at 120° C. was coated on the intermediate layer by hot-melt coating in a dry thickness of 4.5 μm to form a coloring layer to prepare a thermal transfer film (Samples 3-1 to 3-5). The melt viscosity of the coloring layer at 100° C. was measured and shown in Table 9. The melt viscosity was measured with the same device under the same conditions as in Example 2. The fuse peak temperature of the coloring layer was measured according to the provision of the JIS K7121-1987 and shown in Table 9. Incidentally, when plural fuse peak temperatures were observed, the peak with the highest endotherm was taken as the fuse peak temperature.

TABLE 9

| | Coloring Layer Coating solution 1 | Coloring Layer coating solution 2 | Coloring Layer coating solution 3 | Coloring Layer coating solution 4 | Coloring Layer coating solution 5 |
|---|---|---|---|---|---|
| Carbon black (1) | 18 parts | 18 parts | 18 parts | 18 parts | 18 parts |
| Ethylene-vinyl acetate copolymer (2) | 11 parts | 11 parts | 11 parts | 11 parts | 11 parts |
| Carnauba wax (3) | 10 parts | 10 parts | 10 parts | 10 parts | 10 parts |
| Paraffin wax (4) | | | | 61 parts | |
| Paraffin wax (5) | 61 parts | | | | |
| Paraffin wax (6) | | 61 parts | | | |
| Paraffin wax (7) | | | 61 parts | | |
| Paraffin wax (8) | | | | | 61 parts |
| Fuse peak temperature (° C.) | 51 | 55 | 59 | 43 | 70 |
| Melt viscosity at 100° C. (mPa · s) | 160 | 160 | 160 | 160 | 160 |

The components used are as follows.

(1) Carbon black (average particle diameter of 40 nm, manufactured by Mitsubishi Chemical Co., Ltd.)

(2) Ethylene-vinyl acetate copolymer (Sumitate HE-10, manufactured by Sumitomo Chemical Co., Ltd.)

(3) Carnauba wax (manufactured by Kato Yoko Corporation)

(4) Paraffin wax (SP-0110, manufactured by Nippon Seiro Co., Ltd.)

(5) Paraffin wax (SR-0120, manufactured by Nippon Seiro Co., Ltd.)

(6) Paraffin wax (SP-1030, manufactured by Nippon Seiro Co., Ltd.)

(7) Paraffin wax (SP-1035, manufactured by Nippon Seiro Co., Ltd.)

(8) Paraffin wax (SP-0160, manufactured by Nippon Seiro Co., Ltd.)

A heat resistant slipping layer coating solution with the following composition was coated with a roll coater on the other side of the thermal transfer film and the film was dried to form a heat resistant slipping layer in a dry thickness of 0.1 μm beforehand.

| <Heat resistant slipping layer coating solution> | |
|---|---|
| Polyvinyl butyral resin (manufactured by Sekisui Chemical Co., Ltd., S-Lec BX-1) | 20 parts |
| Talc (manufactured by Nippon Talc Co., Ltd., Microace L-1) | 30 parts |
| Melamine resin fine particle (manufactured by Nippon Shokubai Co., Ltd., Epostar S) | 30 parts |
| Polyisocyanate (manufactured by Takeda Chemical Industries, Ltd., Takenate A-3) | 40 parts |
| Toluene/methyl ethyl ketone (weight ratio of 1/1) | 900 parts |

The thermal transfer films obtained in the above-mentioned manner (Samples 3-1 to 3-5) were evaluated for coating suitability of intermediate layer, coating suitability of coloring layer, printing quality (lack of impression and entanglement), and secret leakage preventing properties. The coating suitability of intermediate layer and secret leakage preventing properties were evaluated in the same manner as in Example 1 and the coating suitability of coloring layer and printing quality (lack of impression and entanglement) were evaluated by the following evaluation methods.

<Coating Suitability of Coloring Layer>

Coating suitability of the coloring layer coating solution on the intermediate layer was observed for the appearance of the coloring layer after coating and evaluated according to the following criteria. The coloring layer was observed with a stereoscopic microscope of a magnification of 10 to 20 times.

A: No streaked irregularity of coating was observed with a stereoscopic microscope, and a uniform surface without irregularity of coating was obtained.

B: Streaked irregularity of coating was observed with a stereoscopic microscope and an uneven surface with irregularity of coating surface was obtained.

C: Much streaked irregularity of coating or streaked area left uncoated with the coloring layer were visually observed and an uneven surface was obtained.

<Printing Quality (Lack of Impression)>

The above-mentioned thermal transfer films were provided for printing on a printer paper (#4024, a Beck smoothness of 32 seconds) manufactured by Xerox Corporation by using a facsimile (Telecopier 7033) manufactured by Fuji Xerox Co., Ltd. operated in the copy mode. The facsimile was modified such that an optional voltage can be applied externally between the common electrode and the ground electrode of the thermal head on the facsimile in order to change the printing energy of the thermal head to an optional value. The script to be copied was printed in capital alphabets (Courier font) of 8 point on a copy paper (WR-100) manufactured by Fuji Xerox Co., Ltd. by using a printer (MICROLINE 900 PSII LT) manufactured by Oki Electronic Industry Co., Ltd.

The script was copied at the minimum voltage allowing a distinction between capital E and B by using the thermal transfer films (Samples 3-1 to 3-5). The capital alphabets on the printed paper printed at the minimum voltage were visually inspected for break of letters and fine lines due to lack of impression and evaluated according to the following criteria.

A: Virtually no break of letters and fine lines due to lack of impression was observed, and an extremely good printing was obtained.

B: Little break of letters and fine lines due to lack of impression was observed, but a good printing was obtained.

C: Much break of letters and fine lines due to lack of impression was observed and a patchy printing with broken letters and broken fine lines was obtained.

<Printing Quality (Entanglement)>

The above-mentioned thermal transfer films were provided for printing on a printer paper (#4024, a Beck smoothness of 32 seconds) manufactured by Xerox Corporation by using a facsimile (Telecopier 7033) manufactured by Fuji Xerox Co., Ltd. operated in the copy mode. The facsimile was modified such that an optional voltage can be applied between the common electrode and the ground electrode of the thermal head on the facsimile in order to change the printing energy of the thermal head to an optional value. The script to be copied was printed in capital and lowercase alphabets (Courier font) of 6 point on a copy paper (WR-100) manufactured by Fuji Xerox Co., Ltd. by using a printer (MICROLINE 900 PSII LT) manufactured by Oki Electronic Industry Co., Ltd.

The script was copied at the minimum voltage allowing a distinction between capital E and B by using the thermal transfer films (Samples 3-1 to 3-5). The lowercase alphabets on the printed paper printed at the minimum voltage were visually inspected for blurry printing of letters due to the entanglement phenomenon and evaluated according to the following criteria.

Incidentally, the "entanglement phenomenon" in the present invention refers to a state where the coloring layer of the thermal transfer film adheres to the surface of a transfer receiving material as a thin film without fusing. In this invention, the "blurry printing" refers to a state where plural lines composing a letter are undesirably connected with each other by the transferred coloring layer.

AA: No blurry printing of letters due to the entanglement was observed, and an extremely good printing was obtained.

A: Little blurry printing of letters due to the entanglement was observed, and a good printing was obtained.

B: Some blurry printing of letters due to the entanglement was observed, but a printing which allowed distinction of letters was obtained.

C: Much blurry printing of letters due to the entanglement was observed, and a printing which made it difficult or impossible to distinguish letters was obtained.

(Evaluation Results)

Evaluation results are shown in Table 10 below.

As shown in Table 10, the thermal transfer films (Samples 3-1 to 3-3) wherein the temperature difference between the fuse peak temperature of the coloring layer and fuse peak temperature (55° C.) of the thermally fusible substance (Placcel 220, manufactured by Daicel Chemical Industries, Ltd.) was 10° C. or less were found to have good coating suitability of intermediate layer, good coating suitability of coloring layer, good printing quality, and good secret leakage preventing properties.

In contrast, the thermal transfer film (Sample 3-4) wherein the above-mentioned temperature difference of the fuse peak temperatures was above 10° C. had good coating suitability of intermediate layer, good coating suitability of coloring layer, good printing quality (lack of impression), and secret leakage preventing properties, but had poorer printing quality (entanglement) than that of the above-mentioned thermal transfer films (Samples 3-1 to 3-3).

Furthermore, the thermal transfer film (Sample 3-5) wherein the above-mentioned temperature difference of the fuse peak temperatures was larger than that of the above-mentioned thermal transfer film (Sample 3-4) had also poorer printing quality (lack of impression) than that of the above-mentioned thermal transfer films (Samples 3-1 to 3-3).

As mentioned above, the present invention has the following advantages.

(1) A thermal transfer film which allows a good printing with less frequent occurrence of lack of impression can be obtained because the melt viscosity of a thermally fusible substance having supercooling properties is in an appropriate viscosity range. Incidentally, the thermal transfer film emits a reduced noise when it is separated from a transfer receiving material.

(2) Furthermore, a disadvantage in that the intermediate layer side of the thermal transfer film adheres to a substrate film side can be eliminated when the thermal transfer film is wound after the intermediate layer is coated, heated, and dried.

(3) Furthermore, when a coloring layer is coated on n intermediate layer of a thermal transfer film by hot-melt coating, the coloring layer ink can be overcoated reliably and stably with a good surface quality even if the thermally fusible substance in the intermediate layer melts by the heat of the heated and fused coloring layer ink and becomes a low-viscous liquid.

(4) It is difficult to read the original printed matter from the thermal transfer films which has been used for printing

TABLE 10

| Thermal transfer film | Coloring layer coating solution | Evaluation results: Coating suitability of intermediate layer | Coating suitability of coloring layer | Printing quality: Entanglement phenomenon | Printing quality: Lack of impression | Secret leakage preventing properties |
|---|---|---|---|---|---|---|
| Sample 3-1 | 1 | A | A | A | A | B |
| Sample 3-2 | 2 | A | A | AA | A | B |
| Sample 3-3 | 3 | A | A | A | A | B |
| Sample 3-4 | 4 | A | A | B | A | B |
| Sample 3-5 | 5 | A | A | B | B | B |

because a carbon black is added to the intermediate layer, which imparts secret leakage preventing properties to the thermal transfer film.

(5) A thermal transfer film which allows a good printing with even less frequent occurrence of lack of impression can be obtained because the melt viscosity of the coloring layer at 100° C. is 150 mPa·s or more and 300 mPa·s or less, or the difference between the fuse peak temperature of the coloring layer and the fuse peak temperature of the thermally fusible substance is 10° C. or less.

What is claimed is:

1. An image forming method comprising steps of:

providing a thermal transfer film comprising a coloring layer formed on a substrate film via an intermediate layer, wherein the intermediate layer is not transferable from the substrate and contains a thermally fusible substance an non-transferable binder resin, the melt viscosity of the thermally fusible substance in the temperature range 15 to 25° C. higher than the fuse peak temperature defined in JIS K7121-1987 of the thermally fusible substance is 100 mPa·s or more and 1000 mPa·s or less, the fuse peak temperature defined in JIS-K7121-1987 of the thermally fusible substance is in the range of 50 to 110° C., and the crystallization peak temperature defined in JIS K7121-1987 of the thermally fusible substance is in the range of −20 to 100° C., and the crystallization peak temperature of the thermally fusible substance is lower than the fuse peak temperature by 10° C. or more and the softening temperature of the binder resin measured by the ring and ball method defined in the JIS K2207-1980 is 130° C. or more and 400° C. or less;

providing a transfer receiving material;

superimposing the transfer receiving material on a coloring layer side of the thermal transfer film;

heating and recording from the substrate film side according to the pixel by pixel heating means and separating the thermal transfer film and the transfer receiving material, whrein a time interval between recording each pixel and separating the thermal transfer film and the transfer receiving material as 2 seconds or less.

2. The image forming method according to claim 1, wherein the heating means is an entire surface glaze-type thermal head or a partial glaze-type thermal-head.

3. The image forming method according to claim 1, wherein the binder resin is incompatible with the thermally fusible substance.

4. The image forming method according to claim 1, wherein the intermediate glass transition temperature defined in the JIS K7121-1987 of the binder resin is higher thant he fuse peak temperature defined in the JIS K7121-1987 of the thermally fusible substance by 2° C. or more.

5. The image forming method according to claim 1, wherein the number average molecular weight of the binder resin is 8,000 or more and 1,000,00) or less.

6. The image forming method according to claim 1, wherein the binder resin is a resin having a benzene ring structure.

7. The image forming method according to claim 6, wherein the binder resin is a polyester resin.

8. The image forming method according to claim 1, wherein a carbon black is incorporated in the intermediate layer.

9. The image forming method according to claim 1, wherein the binder resin forms a porous membrane which is not thermally transferable and the thermally fusible substance is contained in the pores of the porous membrane.

10. The image forming method according to claim 9, wherein a carbon black is incorporated in the porous membrane.

11. The image forming method according to claim 1, wherein the melt viscosity of the coloring layer at 100° C. is 150 mPa·s or more and 300 mPa·s or less.

12. The image forming method according to claim 1, wherein the difference between the fuse peak temperature defined in the JIS K7121-1987 of the coloring layer and the fuse peak temperature defined in the JIS K7121-1987 of the thermally fusible substance is 10° C. or less.

* * * * *